No. 697,476. Patented Apr. 15, 1902.
F. P. GORIN.
CASH REGISTER.
(Application filed May 14, 1901.)
(No Model.) 6 Sheets—Sheet 1.

No. 697,476. Patented Apr. 15, 1902.
F. P. GORIN.
CASH REGISTER.
(Application filed May 14, 1901.)
(No Model.) 6 Sheets—Sheet 3.

Witnesses
Inventor
Fred P. Gorin
By Proeder & Darby
Attys

No. 697,476. Patented Apr. 15, 1902.
F. P. GORIN.
CASH REGISTER.
(Application filed May 14, 1901.)
(No Model.) 6 Sheets—Sheet 4.

No. 697,476. Patented Apr. 15, 1902.
F. P. GORIN.
CASH REGISTER.
(Application filed May 14, 1901.)
(No Model.) 6 Sheets—Sheet 5.

No. 697,476. Patented Apr. 15, 1902.
F. P. GORIN.
CASH REGISTER.
(Application filed May 14, 1901.)
(No Model.) 6 Sheets—Sheet 6.

UNITED STATES PATENT OFFICE.

FRED P. GORIN, OF CHICAGO, ILLINOIS.

CASH-REGISTER.

SPECIFICATION forming part of Letters Patent No. 697,476, dated April 15, 1902.

Application filed May 14, 1901. Serial No. 60,171. (No model.)

*To all whom it may concern:*

Be it known that I, FRED P. GORIN, a citizen of the United States, residing at Chicago, in the county of Cook and State of Illinois, have invented a new and useful Cash-Register, of which the following is a specification.

This invention relates to cash-registers.

The object of the invention is to provide a cash registering, counting, or indicating mechanism which is simple in construction and efficient in operation.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Fig. 3 is a view similar to Fig. 2 on the line 3 3 of Fig. 4 looking in the direction of the arrows. Fig. 12 is a broken detail view showing the openings through the casing for disclosing the register. Fig. 13 is an enlarged broken detail view of a portion of a scoring or counting device, showing a register-actuating pawl pivotally mounted thereon.

The same part is designated by the same reference-sign wherever it occurs throughout the several views.

One of the primary objects of my invention is to provide a cash registering, indicating, or counting mechanism wherein the amount of each purchase may be registered and counted and the amount of the purchase indicated to each purchaser and wherein when a register count or indication is once effected the parts are locked, so that a further count, register, or indication is prevented until the counters, registers, or indicating devices previously employed are returned to initial position. It is also within the contemplation of my invention to provide a construction and arrangement which is simple and economical in construction.

Referring to the accompanying drawings, reference-sign A designates a suitable casing, which may be of any suitable construction, arrangement, and style or design adapted to contain the working parts of the apparatus. Suitably mounted within said casing is a support, upon which is mounted a series of counting, scoring, or indicating devices B, the first one of the series being designated by reference-sign B'. The support upon which the movable counters or scorers B B' are mounted is preferably made in sections C C', mounted for axial movement relative to each other. For instance, the section C is stationary, while the section C' (which is arranged in longitudinal continuation of section C) is provided with pintles D D', the pintle D' being stepped or journaled in any suitable manner in the section C and the pintle D being journaled in a bearing formed in the casing A. By this construction axial rotation of section C' relatively to section C may be effected. It is obvious that many other constructions for securing relative movement of the sections C C' may be devised and employed without departure from the spirit or scope of my invention. In the particular form shown, to which, however, my invention is not to be limited or restricted, the scoring, counting, or indicating devices B are mounted upon the supporting-sections C C' for movement therealong or lengthwise thereof, and to this end said counters, scorers, or indicating devices may be in the form of buttons and of any suitable or convenient shape in cross-section, with a hole or opening therethrough to enable the same to be strung upon the support. Section C of the support should be of a length adapted to receive thereon all of the counting or scoring buttons B B', as most clearly shown in Fig. 2, and similarly section C' of the support should also be of a length adapted to receive all of the counting or scoring buttons.

Figure 2:
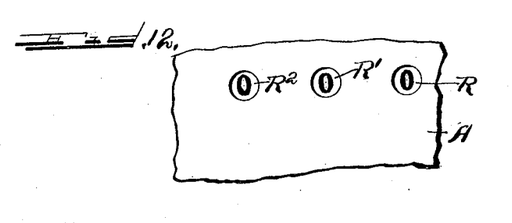
Fig. 2 is a view in vertical longitudinal section on the line 2 2 of Fig. 4 looking in the direction of the arrows.
Figures 4, 14:
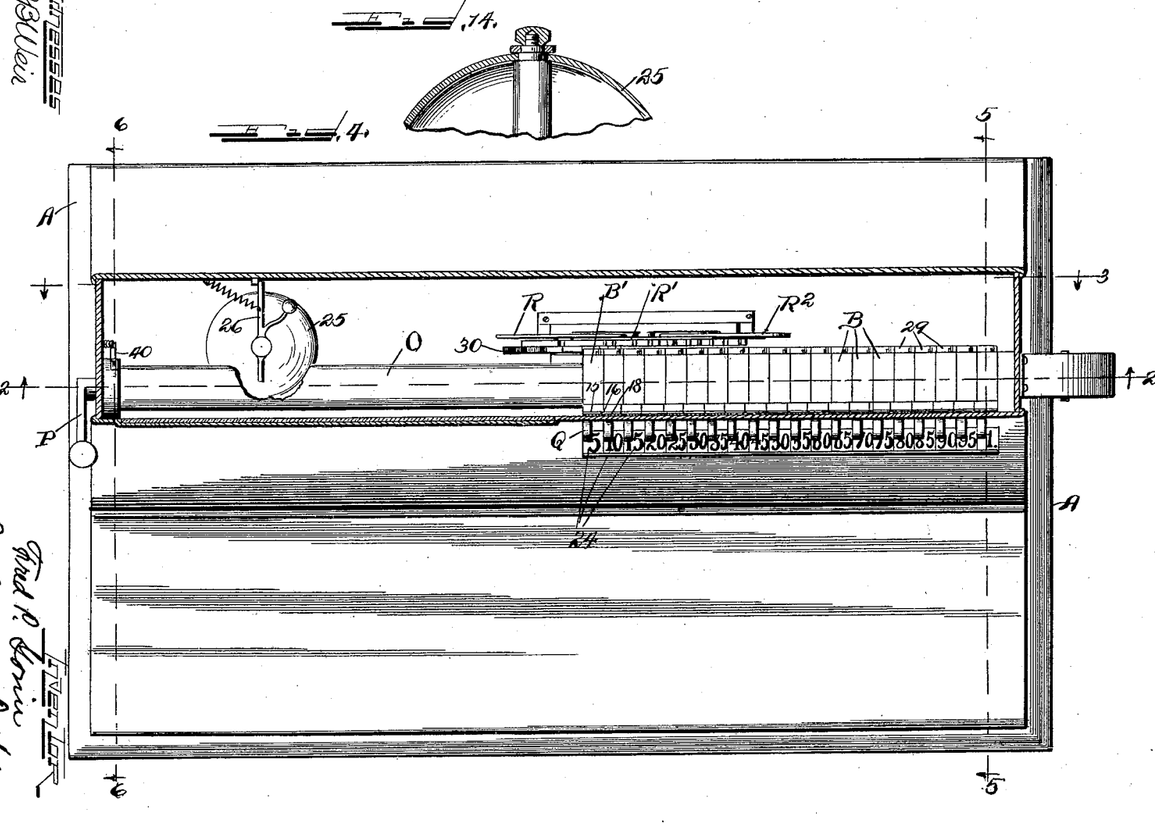
Fig. 4 is a top plan view, parts in horizontal section, on the line 4 4 of Fig. 5 looking in the direction of the arrows.
Fig. 14 is a broken detail view in section of the alarm or signal bell.

Upon supporting-section C are pivoted a series of pawls E, said pawls being spaced a distance apart corresponding approximately to the transverse width or thickness of a scoring or counting button and so relatively arranged that when the entire series of counters or buttons occupies an extreme normal or initial position, as shown in Fig. 2, the pivoted pawls E will be folded or swung back alongside of the supporting-section and within the buttons or counters, and the relative arrangement of said pawls and buttons is such that when a group containing one or more of the buttons is advanced from the initial or normal position thereof (shown in Fig. 2) toward the opposite end of the support or into scoring, registering, or counting position the pawls uncovered thereby are permitted to drop down, so that the lower ends thereof will project below the support C, thereby forming a lock for the scorers or buttons remaining behind or which are not advanced toward scoring position. If desired, and as shown, a stop F is provided, against which the pawls strike and which serves to prevent said pawls from being swung or rocked except in one direction, as will be explained more fully hereinafter.

While I have shown and described pivoted pawls which yield readily when the scorers or buttons are moved toward the right, so as to be folded or swung back to permit the scorers or buttons to be so moved—as, for instance, when returning from scoring or counting position—but which when any one or more of the buttons is moved into or toward scoring relation are permitted to swing or drop down to form a lock for the scorers or buttons remaining behind, it is obvious that many other specifically different constructions of locking devices arranged to permit of the same operation may be devised and employed and still fall within the spirit and scope of my invention. I do not desire, therefore, to be limited or restricted to the specific details of construction and arrangement in this feature.

Figure 8:
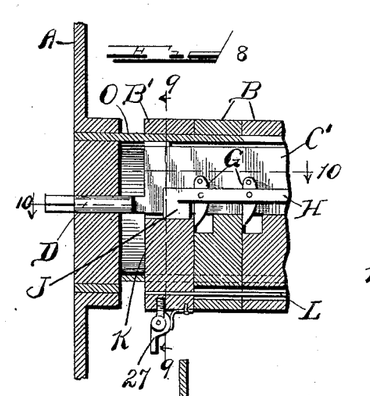
Fig. 8 is a broken detail view in section, showing the means for locking the first or initial scoring or counting device when in scoring or counting position.
Figures 9, 11:
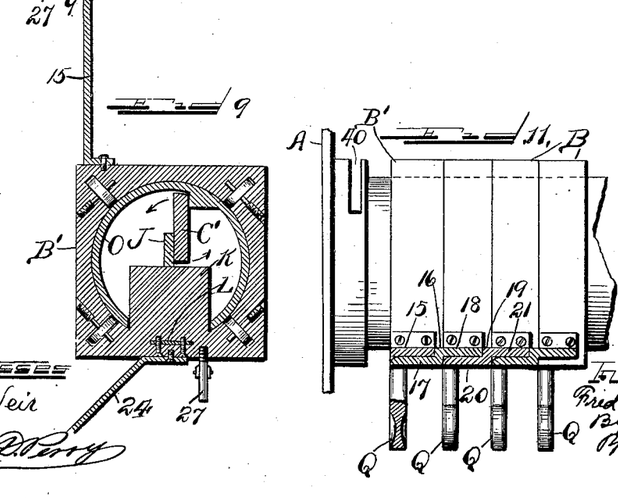
Fig. 9 is a detail sectional view on the line 9 9, Fig. 8, looking in the direction of the arrows.
Fig. 11 is a broken detail view in top plan, parts in horizontal section.
Figure 10:
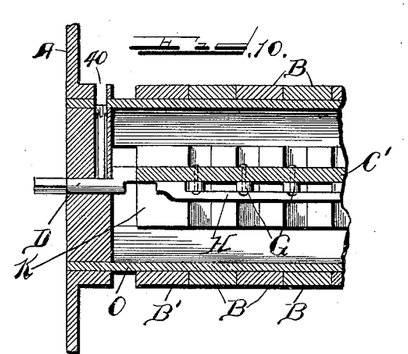
Fig. 10 is a similar view on the line 10 10, Fig. 8, looking in the direction of the arrows.

Upon the rocking or relatively movable section C' of the support are similarly pivoted a series of pivoted pawls G, also spaced a distance apart corresponding approximately to the transverse width or thickness of a button or scorer B. The series of pivoted or movable pawls G are arranged to freely swing in either direction. A rod H is pivotally connected to all of the pawls or stops G. At the extreme left-hand end of rod H is provided an enlarged head J, and the extreme or end button or scorer B' is provided with a lug or projection K, (most clearly shown in Figs. 8, 9, and 10,) adapted when said button is in its extreme limit of movement into scoring or counting position, as shown in Figs. 8, 9, and 10, to form a surface or bearing against which the head J engages, thereby forming a lock to limit swinging movement in one direction of said rod H, and hence locking all of the pawls G against backward movement so long as said button or scorer B' remains in its extreme advanced position. The rocking movement of section C' of the support, as above explained, serves to carry the head J of rod H out of engagement with projection K to permit the button B' to be returned to its initial position, as shown in Fig. 2. The button or scorer B' may be advanced to its extreme scoring position against the action of any suitable retractile which normally tends to return said button to its initial position. Many specifically different arrangements of returning mechanism may serve the purpose. While I have shown a simple construction which is efficient, I do not desire to be limited thereto. In the form shown a cord, belt, band, or other suitable connection L is connected to the extreme scorer or button B', said cord, rope, or band being operated from or wound upon a spring-actuated drum M in a usual and well-understood manner, a spring N being shown in Fig. 3 for actuating said drum. The tension of the spring N normally operates to coil the cord, rope, band, or other connection upon the drum. Thus when the initial or first scorer B' is advanced from the position thereof shown in Fig. 2—that is, from its initial or retracted position toward scoring or counting position—such movement is opposed by the action of the spring-drum, which normally operates to return the same. Consequently when said counter or scorer occupies its extreme advanced position, as indicated in Figs. 8 and 10, and the section C' of the support is moved to cause the head J to clear the projection K on said scorer or counter, the retractile operates to instantly return the scorer or counter B', and with it all the other scorers or counters which have been advanced, into counting or scoring position.

If desired and in order to protect and conceal the locking-stops E and G, the support may be inclosed within a casing, which in the form shown comprises a tube O. It is obvious, however, that the casing O may be of any suitable or convenient shape in cross-section. I have shown said tube of a cylindrical form. If desired, the counters or scorers may be supported directly upon the casing O, each counter or scorer being provided with an opening therethrough enabling the same to be strung upon said casing. The casing is rigidly supported within the inclosing casing A of the machine and extends from side to side of said inclosing casing, and the supporting-section C may be rigidly connected or fixed within the tube O, and the section C' is journaled to rock within said tube. The tube or casing when employed is split or open on the underside thereof, as clearly indicated in Fig. 9, and the buttons or scorers are provided with projections K', which extend or project into the tube O through such opening, (the projections K' corresponding with the projection K, shown in Fig. 9, of button or scorer B',) thus bringing said projections into suitable relation with respect to the movable stops E and G and also serving as guides for the buttons to prevent the same from binding upon the tube O. The rocking movement above referred to may be imparted to the section C' of the stop-support in any suitable or convenient manner. In the particular form shown, to which, however, I do not desire to be limited or restricted, the pintle D is arranged to project through the casing A, as clearly shown in Figs. 2, 7, 8, and 10, and mounted on such projecting end is a handle or lever P, by which the desired rocking movement may be imparted.

Figure 1:
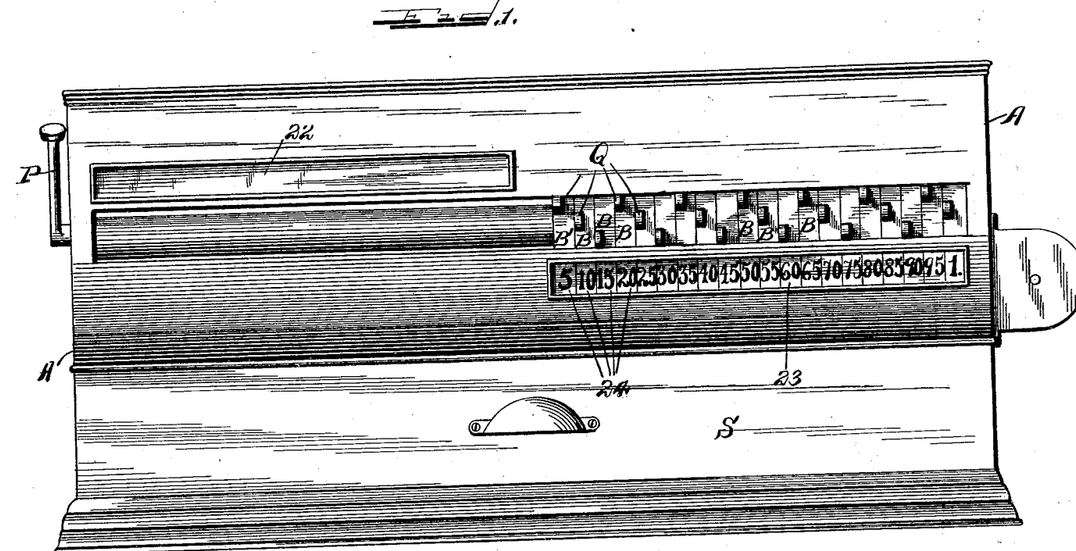
Figure 1 is a view in front elevation of a cash registering, counting, or indicating device embodying the principles of my invention.
Figure 5:
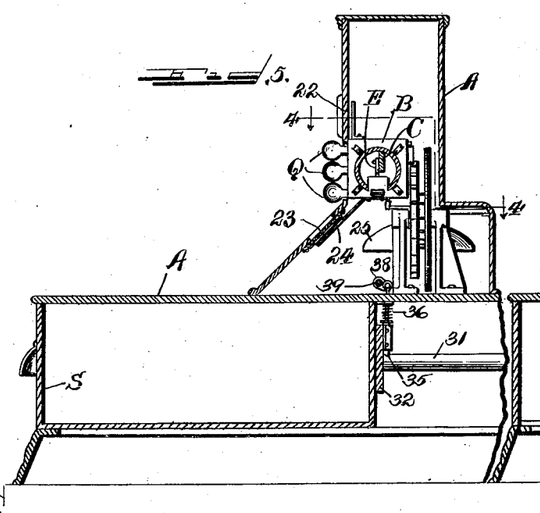
Fig. 5 is a view in transverse section on the line 5 5 of Fig. 4 looking in the direction of the arrows.

The scorers or buttons may be advanced to scoring position in any suitable or convenient manner. In order to afford a ready means for engaging or grasping said buttons by hand to move the same toward or into counting or scoring position, I provide each button with a handle or projection Q, though it is obvious that many other means for effecting an engagement with the buttons to advance or move the same may be employed without departure from the spirit or scope of my invention. The handles Q shown afford simple and convenient hand-grips for this purpose, and in order to afford ample clearance to enable said handles or projections to be grasped by an operator said handles or projections may be arranged in staggered relation, as most clearly shown in Figs. 1 and 5. The operation of this part of my invention is as follows: When all of the scorers or buttons are in their normal or retracted position, as shown in Fig. 2, the locking pawls or stops E are folded back or up out of engaging or stopping relation. When, however, say the first button B' is moved toward the left from the position shown in Fig. 2, as soon as said button has moved a sufficient distance for the first stop or pawl E to be released said stop or pawl drops down against its stop-pin F, thereby forming a lock for preventing the second scorer or button B from being moved toward the left. The first scorer or button B' is moved against the action of its retractile until it occupies its extreme counting or scoring position, as shown in Figs. 8, 9, 10, and 11, the several locking pawls or stops G folding back to permit of the passage of said scorer or button toward scoring position. When said button finally reaches its scoring position, the last stop G of the series drops down into engaging relation with respect to the rear edge of projection K, as clearly shown in Fig. 8, and the head J of rod H forms a bearing against the projection K, as also clearly shown, thereby locking the rod H against longitudinal movement, and consequently locking the pawl G. Thus the scorer or button B' is locked in its advanced scoring or counting position and all the other buttons or scorers are locked against movement from initial position. Before any additional buttons or scorers can be moved from initial position into scoring relation the first scorer or button B', which has previously been advanced, must return to initial position. In order to effect such return, the section C' of the stop-support is axially rotated in the direction indicated by the arrows in Fig. 9 by the manipulation of arm P or otherwise, so as to enable the head J to clear the surface of projection K, whereupon the retractile operates to immediately return the scorer or button B'. The operation is then repeated as before.

It is obvious that instead of moving the initial button B' alone into scoring relation a group of the buttons may be moved at the same time, provided they are moved *en masse*— that is, two, three, or any other number of buttons may be simultaneously advanced into scoring position—and when moved from initial position the buttons remaining undisturbed are automatically locked by the locking-pawls against movement toward scoring position until the buttons thus advanced are again returned to initial position, and as soon as the group of buttons which have been advanced together attain their advanced or scoring position, with the head J of arm H bearing upon the surface of projection K, said buttons are locked in advanced position until the head J is disengaged from projection K, this disengagement requiring the manual operation or movement of section C' of the support. Thus I provide an exceedingly simple and efficient arrangement of mechanism for a cash registering or counting machine.

If desired, I may provide means for indicating to the purchaser the amount of the purchase. This result may be accomplished in many different ways. I have shown a simple arrangement (to which, however, I do not desire to be limited) in which I mount upon each button or scoring device a plate or strip bearing the value of such button or scorer. A simple arrangement is for each separate or individual button or scorer to represent the same value—say, for instance, each button or scorer represents five cents. Then upon the plate 15 of the first scorer or button B' will be marked the number "5," and upon the plate or other convenient part of the next adjacent button is marked the number "10," and of the third button or scorer the number "15," and so on for as many buttons as are employed. Means may be provided whereby when any number of buttons are advanced into scoring or counting position only the sum-total of such buttons will be indicated to the purchaser, and therefore in carrying out my invention I propose to provide means whereby each succeeding button after the first when in scoring position conceals or covers up the indicated score or number on the preceding button, so that when two or more buttons are simultaneously moved into scoring position only the value of the last button will be disclosed. This idea may be embodied in many different ways. A simple arrangement is shown, wherein the second button is provided with a plate 16, somewhat S-shaped in cross-section, as clearly shown in Fig. 11, the portion 17 thereof adapted to slide over or in front of the plate 15 of the primary button B', while the portion 18 carries the figure indicating the value of said second button—for instance, said portion 18 in the illustration given bearing the number "10." Similarly the next succeeding button is provided with a similarly-shaped plate 19, the portion 20 of which when said third button is in scoring relation covers or conceals the value of the preceding button, while the portion 21 thereof bears and discloses the value of said third button, and so on throughout the entire series. The casing A may be provided at the scoring end thereof with an opening 22 therethrough, and which opening may be provided with a glass or other transparent cover, through which the indicating-figures are disclosed. It is obvious that the indicating-figures may be disclosed from either the front or rear of the machine. I have shown a construction adapted for disclosing the indications toward the front of the machine.

If desired and in order to enable the operator to effect a counting or registering of the amount of a purchase, for instance, without individually counting the buttons to be moved into scoring position, the buttons may be provided with an additional series of indicating-figures showing at once the sum-total. Thus the first or primary button B' is suitably marked "No. 5," indicating five cents in the illustration above given, the second button "No. 10," the third button "No. 15," and so on, which indications are arranged to be disclosed through a suitable or convenient opening 23 in the casing when the buttons occupy their initial or normally-retracted position, as clearly shown in Fig. 1, the entire series of indications being constantly disclosed—that is, the indication of one button is not concealed by the indication of the next adjacent button, as in the case where the amount of the purchase is disclosed to the purchaser, as in the first series of indications above referred to. A convenient arrangement of the second series of indications is to provide each button with a plate 24, as clearly shown in Figs. 5 and 9, arranged to project into convenient relation for the numbers placed thereon to be disclosed through the opening 23 in the casing, as clearly shown. Thus the clerk or operator of the machine is enabled to determine at a glance what particular button to move into scoring position to register and indicate the desired amount of the purchase, and when the scorers or buttons are in scoring relation only the aggregate or total amount of the purchase will be indicated.

In order that the machine may be complete in all the details and requisites of a cash registering, scoring, and indicating mechanism, I may associate with the scoring and indicating devices above described other features customary to be embodied in machines of this kind—for instance, a signal-bell arranged to give an alarm whenever one or more of the scorers or buttons are moved into scoring relation. I also combine with the apparatus above described a counting mechanism, to the end that the sum-total of all purchases may be recorded. I may also combine with the scoring and indicating mechanism means for locking and releasing the cash-drawer.

Any suitable arrangement of bell or alarm mechanism may be employed. In the form shown I employ a bell 25, suitably mounted with reference to the path of movement of the buttons for the clapper 26 thereof to be engaged by a projection 27, carried by the primary button B'. If desired, the projection 27 may be in the form of a pivoted pawl arranged to yield when the button is moved in one direction to permit said button to pass the clapper lever or arm 26 without ringing the bell, but to drop back into position to engage said clapper-arm to actuate the same when moved in the opposite direction, thus effecting the signal or alarm. My invention, however, does not reside in the specific details of construction and arrangement of the bell or signal device disclosed, but only in the combinative arrangement thereof with the other parts described, and therefore the specific details of construction and arrangement of such bell or signal are unimportant so far as the present invention is concerned.

Any desired simple or convenient arrangement of counting mechanism, such as is usually or ordinarily employed in machines of this class, may be used in connection with my invention, and the specific details of construction of such mechanism forms in itself no part of my present invention. A simple form is shown, however, comprising disks R R' R², the disk R bearing figures of the "units" denomination, the disk R' bearing figures of the "tens" denomination, and the disk R² figures of the "hundreds" denomination. A step-by-step rotation may be imparted to disk R by any suitable pawl mechanism actuated by the buttons when moved toward scoring position. To this end each button is provided with a pivoted pawl 29, arranged in position to engage a tooth on a ratchet-wheel 30, connected to disk R, so that as each button is moved into scoring position it engages a ratchet-tooth and advances disk R one step. The pawls 29 are pivoted, as clearly shown in Fig.

Figure 6:
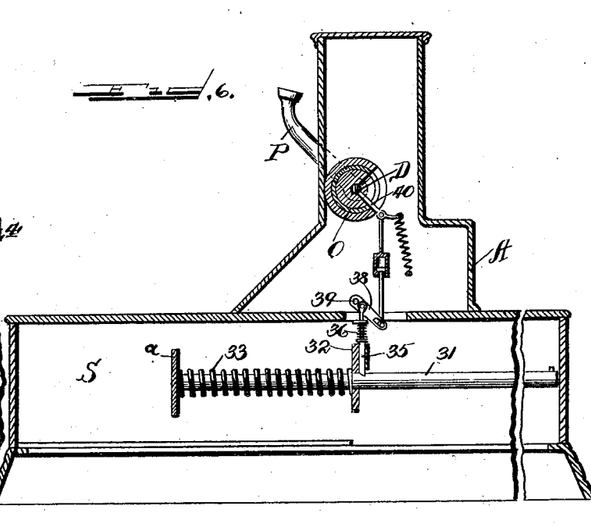
Fig. 6 is a similar view on the line 6 6, Fig. 4, looking in the direction of the arrows.
Figure 7:
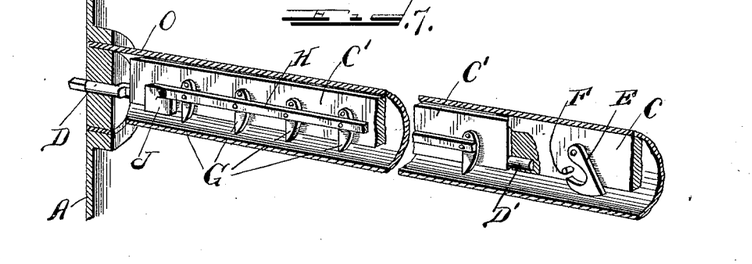
Fig. 7 is a broken sectional detail view in perspective of a portion of the locking mechanism for the indicating or scoring devices.

13, so as to permit the return movement of the buttons to initial position without effecting a register of the counting mechanism. Similarly the disk R' may be advanced one step in any suitable and well-understood manner upon each complete revolution of disk R, and so on with respect to disks R' and R². The numbers thus registered may be disclosed through suitable openings in casing A, as shown in Fig. 12, as seen in said figure all of the registering wheels or disks being in their zero position. The drawer-locking mechanism may also be of any suitable or convenient construction and arrangement, and in the specific details of construction thereof forms no part of my present invention. In the particular form shown the drawer S is arranged to be locked in closed position and to be automatically released whenever any button or buttons which have been advanced into counting, scoring, or indicating position are released for return to initial position. The locking and automatic release of the drawer may be effected in many different ways. In the form shown the drawer is provided with rods 31 at each side thereof, which rods operate through plates 32, (see Figs. 2 and 6,) and springs 33 are interposed between the fixed plate 32 of the main casing and wings or flanges a, carried by the sides of the drawer. These springs are arranged to be compressed when the drawer is in closed position, and the tension thereof is normally tending to throw the drawer open. In the fixed plate 32 is formed guide-bearings 34, in which is arranged to slide a locking-rod 35, and the rods 31 are provided with seats or projections arranged to receive the ends of the locking-rods 35. Springs 36 normally operate to throw the locking-rods 35 into engaging relation with respect to the rods. Each locking-rod is connected to a crank-arm 38, mounted on a shaft 39, and rocking movement may be imparted to said shaft in any suitable manner, as by means of a crank-arm 40, connected to rock with the pintle D of section C' of the stop-support, said crank-arm 40 being suitably connected to a crank-arm on shaft 39, as clearly shown in Fig. 6. Thus when the rocking section C' of the stop-support is actuated to release any button or scoring device which has been advanced to counting, indicating, or scoring position the locking-pawls 35 are withdrawn from engaging relation with respect to the rods 31 and the drawer is thrown open by the springs 33, and when the drawer is again returned to closed position the stops 35 automatically engage the rods to lock the drawer in closed position. It is obvious that the bell or alarm or the counting or registering mechanism and the drawer-locking mechanism may be omitted, if desired, or the construction thereof altered or varied in the details or arrangement of parts, without departure from the spirit or scope of my invention. It is also obvious that other features usually employed in connection with counting or indicating machines of this character may be also embodied. I do not desire, therefore, to be limited or restricted in respect of such added accessories; nor do I desire to be limited or confined to the specific details of construction and arrangement of the scoring-buttons or the automatic locking-stops therefor, as the broad principles of my invention may be embodied in many other specifically different arrangements; but, Having now set forth the object and nature of my invention and a construction embodying the principles thereof as the best form of illustrative means in which I at present contemplate carrying the same into practical operation, and having described such construction, its purpose, function, and mode of operation, what I claim as new and useful and of my own invention, and desire to secure by Letters Patent, is—

1. In a cash-registering or similar machine, a series of counters or scorers adapted to be manually engaged and moved into scoring or counting position in a group containing one or more of such counters or scorers, and means for locking the remaining counters or scorers against movement while the advanced counters or scorers remain in advanced position, as and for the purpose set forth.

2. In a cash-registering or similar machine, a series of counters or scorers adapted to be manually engaged and moved into scoring or counting position in a group containing one or more of such counters or scorers, in combination with means for locking said counters or scorers in advanced or counting or scoring position, as and for the purpose set forth.

3. In a cash-registering or similar machine, a series of counters or scorers adapted to be manually engaged and moved into scoring or counting position in a group containing one or more of such counters or scorers, in combination with means for locking said group in scoring or counting position, and means for releasing said lock, as and for the purpose set forth.

4. In a cash-registering or similar machine, a series of counters or scorers adapted to be moved into scoring or counting position in a group containing one or more of such counters or scorers, means normally tending to return said counters or scorers to initial position, means for locking said counters or scorers in counting or scoring position, and means for releasing said lock, as and for the purpose set forth.

5. In a cash-registering or similar machine, a series of counters or scorers adapted to be moved into scoring or counting position in a group containing one or more of such counters or scorers, means for locking said counters or scorers in counting or scoring position, and manually-actuated devices for releasing said locking means, as and for the purpose set forth.

6. In a cash-registering or similar machine, a series of counters or scorers adapted to be moved into counting or scoring position in a group containing one or more of such counters or scorers, means normally operating to return said counters or scorers to initial position, locking means for retaining said counters or scorers in counting or scoring position, and manually-actuated devices for releasing said locking means, as and for the purpose set forth.

7. In a cash-registering or similar machine, a series of counters or scorers adapted to be manually engaged and moved into scoring or counting position in a group containing one or more of such counters or scorers, means for locking the advanced counters or scorers in counting or scoring position, and means for locking the remaining counters or scorers in initial position, as and for the purpose set forth.

8. In a cash-registering or similar machine, a series of counters or scorers adapted to be moved into counting or scoring position in a group containing one or more of such counters or scorers, means whereby when a group of such counters or scorers is moved to counting or scoring position the remaining counters or scorers are locked, and means operated by the return of the advanced counters or scorers for releasing said lock, as and for the purpose set forth.

9. In an apparatus of the class described, a support, a series of counters or scorers mounted to move relatively to said support, and a corresponding series of locking devices whereby when any one or more of the scorers or counters are moved into scoring or counting position the remaining counters or scorers are locked against movement, as and for the purpose set forth.

10. In an apparatus of the class described, a support, a series of counters or scorers mounted thereon and adapted to be manually engaged and moved therealong, a locking device arranged when any one or more of such counters or scorers are moved into counting or scoring position to lock the remaining counters or scorers against movement into counting or scoring position, as and for the purpose set forth.

11. In an apparatus of the class described, a support, a series of counters or scorers mounted thereon for movement relatively thereto, a stop device pivotally mounted upon said support and so arranged that when one or more of said counters or scorers is moved into counting or scoring position the remaining counters are locked against movement toward or into counting or scoring position, as and for the purpose set forth.

12. In an apparatus of the class described, a series of counters or scorers mounted thereon for movement therealong, a corresponding series of stop devices pivotally mounted upon said support, said stop devices operating, when any one or more of said counters or scorers are moved toward counting or scoring position, to lock the remaining counters or scorers against movement into counting or scoring relation, as and for the purpose set forth.

13. In an apparatus of the class described, a support, a series of counters or scorers mounted for movement thereon, a pawl pivotally suspended upon said support and arranged to yield in one direction, a stop-pin for limiting the rocking movement of said pawl in the opposite direction, as and for the purpose set forth.

14. In an apparatus of the class described, a support, a series of counters or scorers mounted thereon for movement therealong, a corresponding series of locking-pawls pivotally suspended from said support and arranged a distance apart corresponding to the transverse thickness of a counter or scorer, as and for the purpose set forth.

15. In an apparatus of the class described, a support, a series of movable counters or scorers mounted thereon for movement therealong, a corresponding series of locking-pawls pivotally suspended from said support, said counters or scorers arranged to engage said pawls, said pawls being arranged to yield in one direction, and means for forming a stop for said pawls in the opposite direction, as and for the purpose set forth.

16. In an apparatus of the class described, a support, a series of counters or scorers mounted thereon, a locking device carried by said support, a rod connected to said locking device, one of said counters or scorers arranged to engage said rod, when in counting or scoring position, to lock the same against movement, as and for the purpose set forth.

17. In an apparatus of the class described, a support, counters or scorers mounted for movement thereon, movable stops suspended from said support, a rod connecting said stops, and means arranged to engage said rod when one or more of said counters or scorers are in counting or scoring position, to lock the same, as and for the purpose set forth.

18. In an apparatus of the class described, a support made in relatively movable sections, a series of counters or scorers mounted upon said support, one of said sections adapted to receive said counters or scorers when out of counting or scoring position, and the other of said sections adapted to receive said counters or scorers when in counting or scoring position, locking devices for locking said counters or scorers in counting or scoring position, and means actuated by the movement of said movable sections for releasing said lock, as and for the purpose set forth.

19. In an apparatus of the class described, a support, counters or scorers mounted for movement thereon, locking devices for holding said counters or scorers in counting or scoring position, and including a movable bar, means for engaging said bar when one or more counters or scorers are in scoring or counting position, for locking the same against movement, and means for releasing said bar from locking position, as and for the purpose set forth.

20. In an apparatus of the class described, a support, a series of counters or scorers mounted thereon, the first or initial counter or scorer provided with a projection, means for locking said counters or scorers in counting or scoring position, including a movable bar, said bar arranged to engage said projection, and means for moving said bar out of engaging relation with respect to said projection, as and for the purpose set forth.

21. In an apparatus of the class described, a support made in relatively movable sections, a series of counters or scorers mounted for movement upon said support, locking devices carried by one section of said support for locking said counters or scorers in initial position, and locking devices carried by the other section of said support for locking said counters or scorers in counting or scoring position, and means actuated by the movement of said movable section for releasing said locking mechanisms, as and for the purpose set forth.

22. In an apparatus of the class described, a support having a stationary section and a relatively movable section, a series of counters or scorers mounted for movement upon said support, locking-pawls pivotally suspended from said supporting-sections and arranged to engage said counters or scorers to lock the same, and means for moving said movable section whereby the locking-pawls carried thereby are released, as and for the purpose set forth.

23. In an apparatus of the class described, a support, a series of counters or scorers mounted thereon including an initial or primary counter, means normally operating to maintain said initial or primary counter or scorer in retracted position, whereby all of said counters or scorers are retained normally in retracted position, stop devices for said scorers, whereby when any one or more of said scorers are moved from said initial or retracted position the remaining scorers are locked against movement, and means for locking said initial or primary scorer in advanced position, as and for the purpose set forth.

24. In an apparatus of the class described, a support, a casing inclosing said support, a series of counters or scorers mounted on said casing for movement therealong, said casing being slotted, said scorers provided with projections extending into said slot, and stop devices carried by said support, as and for the purpose set forth.

25. In an apparatus of the class described, a hollow or tubular casing, a series of counters or scorers arranged to be strung upon said casing for movement therealong, and stop devices carried by said casing, as and for the purpose set forth.

26. In an apparatus of the class described, a hollow casing, a support arranged therein and including a stationary section and a movable section, stop devices carried by said sections, and counters or scorers mounted upon said casing and movable therealong, and arranged to be engaged and locked by said stop devices, as and for the purpose set forth.

27. In an apparatus of the class described, a hollow or tubular casing, a stationary supporting-section mounted therein, a rocking supporting-section also mounted within said casing, stop devices carried by each of said supporting-sections, a series of counters or scorers adapted to be strung upon said casing, and means for rocking said supporting-section, as and for the purpose set forth.

28. In an apparatus of the class described, a support, a series of counters or scorers movably mounted thereon and each provided with a handle whereby said counters or scorers may be grasped and moved with reference to said support and into counting or scoring position, and means for locking said counters or scorers in counting or scoring position, as and for the purpose set forth.

29. In an apparatus of the class described, a support, a series of counters or scorers movably mounted thereon and each provided with a grasping-handle, said grasping-handles being arranged in staggered relation, whereby said counters or scorers may be moved into counting or scoring position, locking devices for locking said counters or scorers when advanced to counting or scoring position, and means for releasing said locking devices, as and for the purpose set forth.

30. In an apparatus of the class described, a support, a series of counters or scorers movably mounted thereon and each provided with indicating devices, means for moving said counters or scorers into scoring position, locking devices for locking the same in advanced or scoring position, and means for releasing said locking mechanism, as and for the purpose set forth.

31. In an apparatus of the class described, a support, a series of indicators arranged to move thereon, each counter or scorer carrying an indicating device adapted to disclose the value thereof to denote the amount of the purchase, and means whereby each counter or scorer when in counting or scoring position will conceal the indicator of the preceding counter or scorer, as and for the purpose set forth.

32. In an apparatus of the class described, a support, a series of counters or scorers strung thereon for movement therealong, and adapted to be moved from initial or normal position into counting or scoring position, an indicator-plate mounted on each counter or scorer, the indicating-plate of each counter or scorer being arranged to lap past the indicator-plate of the preceding counter or scorer when said counters or scorers are in counting or scoring position, as and for the purpose set forth.

33. In an apparatus of the class described, a support, a series of counters or scorers mounted thereon for movement therealong, an indicator-plate carried by each counter or scorer, said indicator-plates being of S shape in cross-section, whereby when the counters or scorers are in counting or scoring position the indicator-plate of each counter or scorer will conceal the indicating-numeral on the indicator-plate of the preceding counter or scorer, as and for the purpose set forth.

34. In an apparatus of the class described, a support, a series of counters or scorers mounted thereon for movement therealong, and adapted to be moved from initial or retracted position into advanced or counting or scoring position, means for locking the counters or scorers in advanced or counting position, and means operating to lock the remaining counters, and an alarm-signal arranged to be actuated when any one or more of the counters are moved to counting or scoring position, as and for the purpose set forth.

35. In an apparatus of the class described, a support, a series of counters or scorers mounted thereon for movement therealong, one of said counters or scorers provided with a projection, an alarm-signal arranged in the path of movement of said counters or scorers and adapted to be engaged by said projection, whereby when said scorers are moved into counting position said alarm-signal is effected, as and for the purpose set forth.

36. In an apparatus of the class described, a support, a series of counters or scorers mounted thereon, all of equal value, means for moving said counters or scorers into counting or scoring position, and a registering mechanism arranged to be actuated by the movement of each of said counters or scorers into counting or scoring position, as and for the purpose set forth.

37. In an apparatus of the class described, a support, a series of counters or scorers mounted thereon for movement therealong, a projection carried by each of said counters or scorers, a registering mechanism arranged to be engaged and actuated by the projection on each of said counters or scorers as they are moved therepast into scoring position, and means for preventing actuation of said registering mechanism during the return movement of said counters or scorers, as and for the purpose set forth.

38. In an apparatus of the class described, a support, a series of counters or scorers mounted thereon for movement therealong, a pivoted pawl mounted upon each counter or scorer, a registering mechanism arranged to be engaged by the pawl on each of said counters or scorers when moved toward counting or scoring position, said pawls yielding to prevent movement of said registering mechanism when said counters are returned to initial position, as and for the purpose set forth.

39. In an apparatus of the class described, a support, a series of counters or scorers mounted thereon for movement therealong, said counters or scorers adapted to be moved into counting or scoring position, means for locking said counters or scorers in advanced or counting or scoring position, and means for releasing said lock, in combination with a cash-drawer, devices for normally holding said drawer in closed position, and means actuated by the release of said lock for releasing said drawer-holding means, as and for the purpose set forth.

40. In an apparatus of the class described, a support, a series of counters or scorers mounted thereon and adapted to be moved into counting or scoring position, locking devices for locking said counters or scorers in advanced or scoring position, releasing mechanism for said locking devices, in combination with a cash-drawer, means for retaining said drawer in closed position, and means actuated by said releasing mechanism for releasing said retaining mechanism, as and for the purpose set forth.

In witness whereof I have hereunto set my hand, this 4th day of May, 1901, in the presence of the subscribing witnesses.

FRED P. GORIN.

Witnesses:
E. C. SEMPLE,
S. E. DARBY.